(12) United States Patent
Suri

(10) Patent No.: US 10,437,815 B2
(45) Date of Patent: Oct. 8, 2019

(54) IDENTIFICATION OF CODE OBJECT DEPENDENCIES

(71) Applicant: Accenture Global Solutions Limited, Dublin (IE)

(72) Inventor: Siddharth Suri, Woodland Hills, CA (US)

(73) Assignee: Accenture Global Solutions Limited, Dublin (IE)

( * ) Notice: Subject to any disclaimer, the term of this patent is extended or adjusted under 35 U.S.C. 154(b) by 336 days.

(21) Appl. No.: 15/255,736

(22) Filed: Sep. 2, 2016

(65) Prior Publication Data
US 2018/0067980 A1 Mar. 8, 2018

(51) Int. Cl.
*G06F 16/23* (2019.01)
*G06F 8/41* (2018.01)
(Continued)

(52) U.S. Cl.
CPC .......... *G06F 16/2365* (2019.01); *G06F 8/433* (2013.01); *G06F 8/436* (2013.01); *G06F 8/437* (2013.01); *G06F 8/71* (2013.01); *G06F 9/5066* (2013.01); *G06F 11/362* (2013.01); *G06F 11/3604* (2013.01); *G06F 11/3608* (2013.01);
(Continued)

(58) Field of Classification Search
CPC .. G06F 16/2365; G06F 16/2379; G06F 16/22; G06F 8/433; G06F 9/5066; G06F 8/436; G06F 8/437; G06F 8/4435; G06F 8/71; G06F 11/3604; G06F 11/3608; G06F 11/362
See application file for complete search history.

(56) References Cited

U.S. PATENT DOCUMENTS 5,423,027 A * 6/1995 Jackson ............... G06F 11/3604
714/38.1
7,614,040 B2 * 11/2009 Wagner .................... G06F 8/71
717/120
(Continued)

FOREIGN PATENT DOCUMENTS

WO WO-2010031731 A1 * 3/2010 ............. G06F 8/433

OTHER PUBLICATIONS

Wikipedia, "CA Workload Automation AE," https://en.wikipedia.org/wiki/CA_Workload_Automation_AE, Aug. 25, 2016, 3 pages.

*Primary Examiner* — David T. Brooks
(74) *Attorney, Agent, or Firm* — Harrity & Harrity, LLP

(57) ABSTRACT

A device may receive a code set that includes a set of objects. The set of objects may include one or more successor objects and one or more predecessor objects corresponding to the one or more successor objects. The device may populate a data structure based on the code set. The data structure may identify each object of the set of objects. The device may identify relationships between the one or more successor objects and the one or more predecessor objects. The device may add, to the data structure and in association with the one or more predecessor objects, dependency information that identifies the relationships between the one or more successor objects and the one or more predecessor objects. The dependency information may identify the one or more successor objects. The device may perform an action based on the dependency information.

20 Claims, 5 Drawing Sheets

(51) Int. Cl.
*G06F 16/22* (2019.01)
*G06F 11/36* (2006.01)
*G06F 8/71* (2018.01)
*G06F 9/50* (2006.01)

(52) U.S. Cl.
CPC .......... *G06F 16/22* (2019.01); *G06F 16/2379* (2019.01)

(56) References Cited

U.S. PATENT DOCUMENTS

| | | | |
|---|---|---|---|
| 9,557,879 B1* | 1/2017 | Wang | G06F 3/0481 |
| 2002/0097253 A1* | 7/2002 | Charisius | G06F 8/20 |
| | | | 715/700 |
| 2004/0117780 A1* | 6/2004 | Sea | G06F 8/423 |
| | | | 717/159 |
| 2004/0205726 A1* | 10/2004 | Chedgey | G06F 8/71 |
| | | | 717/125 |
| 2007/0162903 A1* | 7/2007 | Babb, II | G06F 8/75 |
| | | | 717/154 |
| 2007/0169027 A1* | 7/2007 | Drepper | G06F 8/71 |
| | | | 717/140 |
| 2008/0288920 A1* | 11/2008 | Takai | G06F 9/45512 |
| | | | 717/114 |
| 2009/0133006 A1* | 5/2009 | Cheung | G06F 8/71 |
| | | | 717/144 |
| 2011/0239195 A1* | 9/2011 | Lin | G06F 8/71 |
| | | | 717/126 |
| 2014/0109106 A1* | 4/2014 | Fanning | G06F 8/433 |
| | | | 718/106 |
| 2015/0363192 A1* | 12/2015 | Sturtevant | G06F 8/72 |
| | | | 717/131 |
| 2016/0034258 A1* | 2/2016 | Wijngaard | G06F 8/73 |
| | | | 717/123 |
| 2017/0046376 A1* | 2/2017 | Yang | G06F 17/30303 |
| 2017/0090889 A1* | 3/2017 | Hale | G06F 8/433 |

* cited by examiner

| Job Number | Dependency | Successor | Box Name | Command |
|---|---|---|---|---|
| DET_Q_5957 | | DET_PROCESS_BOX | | |
| DET_DATE_BOX | | | | |
| DET_Q_5958 | success(DET_Q_5957.1) | | DET_DATE_BOX | sendevent -E SET_GLOBAL -G "DATADATE=`date +%Y%m%d`" |
| DET_Q_5960 | | | DET_PROCESS_BOX | /scripts/wrapper.ksh |

505 510 520 525 530
515

| Job Number | Description | Alarm If Fail | Date Condition | Start Times | Days Of Week | watch_file | watch_interval |
|---|---|---|---|---|---|---|---|
| DET_Q_5957 | Autosys Job for : APP_ZIP_FILE_CHECK | 1 | 1 | 22:00 | all | $$BASEDIR/inbox/*SAMPLE.zip* | 15 |
| DET_DATE_BOX | Autosys Box Job for : Assign Run Date | 1 | 1 | 22:05 | all | | |
| DET_Q_5958 | Autosys Job for : Assign Run Date | 1 | 1 | | all | | |
| DET_PROCESS_BOX | Autosys Box Job for : ETL Pre Process | 1 | 1 | | | | |
| DET_Q_5960 | Autosys Job for : ETL Pre Process | 1 | 1 | | | | |

IDENTIFICATION OF CODE OBJECT DEPENDENCIES

BACKGROUND

Computer operations may be performed based on a set of objects of a code set. For example, computer operations may be performed based on a set of jobs (e.g., units of work or execution by a computer system) that may be defined, scheduled, monitored, and/or the like, so as to control the computer operations. Within the set of objects, an object may have a dependency on one or more other objects. For example, a job may not be able to start until another job is finished.

SUMMARY

According to some possible implementations, a device may include one or more processors. The one or more processors may receive a code set that includes a set of objects. The set of objects may include one or more successor objects and one or more predecessor objects corresponding to the one or more successor objects. The one or more predecessor objects, when processed, may generate output information that is used as input information by the one or more successor objects. The one or more processors may populate a data structure based on the code set. The data structure may identify each object of the set of objects. The one or more processors may identify relationships between the one or more successor objects and the one or more predecessor objects. The one or more processors may add, to the data structure and in association with the one or more predecessor objects, dependency information that identifies the relationships between the one or more successor objects and the one or more predecessor objects. The dependency information may identify the one or more successor objects. The one or more processors may perform an action based on the dependency information.

According to some possible implementations, a computer-readable medium may store one or more instructions that, when executed by one or more processors, may cause the one or more processors to receive a code set that includes a set of objects. The set of objects may include one or more successor objects and one or more predecessor objects corresponding to the one or more successor objects. The one or more predecessor objects, when processed, may generate output information that is used as input information by the one or more successor objects. The one or more instructions, when executed by one or more processors, may cause the one or more processors to populate a data structure based on the code set. The data structure may identify each object of the set of objects. The one or more instructions, when executed by one or more processors, may cause the one or more processors to identify relationships between the one or more successor objects and the one or more predecessor objects. The one or more instructions, when executed by one or more processors, may cause the one or more processors to add, to the data structure and in association with entries corresponding to the one or more predecessor objects, dependency information that identifies the one or more successor objects. The one or more instructions, when executed by one or more processors, may cause the one or more processors to perform an action based on the dependency information.

According to some possible implementations, a method may include receiving, by a device, a code set that identifies a set of jobs. The set of jobs may include a set of successor jobs and a set of predecessor jobs corresponding to the set of successor jobs. Each predecessor job, of the set of predecessor jobs, may be performed or executed before one or more corresponding successor jobs of the set of successor jobs. The method may include populating, by the device, a data structure based on the code set. The data structure may identify the set of predecessor jobs and the set of successor jobs. The method may include identifying, by the device, relationships between the set of predecessor jobs and the set of successor jobs. The relationships may identify each predecessor job and the one or more corresponding successor jobs associated with each predecessor job. The method may include adding, by the device to the data structure, dependency information that identifies the relationships between the set of predecessor jobs and the set of successor jobs. The dependency information may identify the set of successor jobs. The dependency information may be added to entries of the data structure corresponding to the set of predecessor jobs. The method may include performing, by the device, an action based on the dependency information.

BRIEF DESCRIPTION OF THE DRAWINGS

FIG. 5 is a diagram of an example data structure relating to the example process shown in FIG. 4.

DETAILED DESCRIPTION

Figure 1:
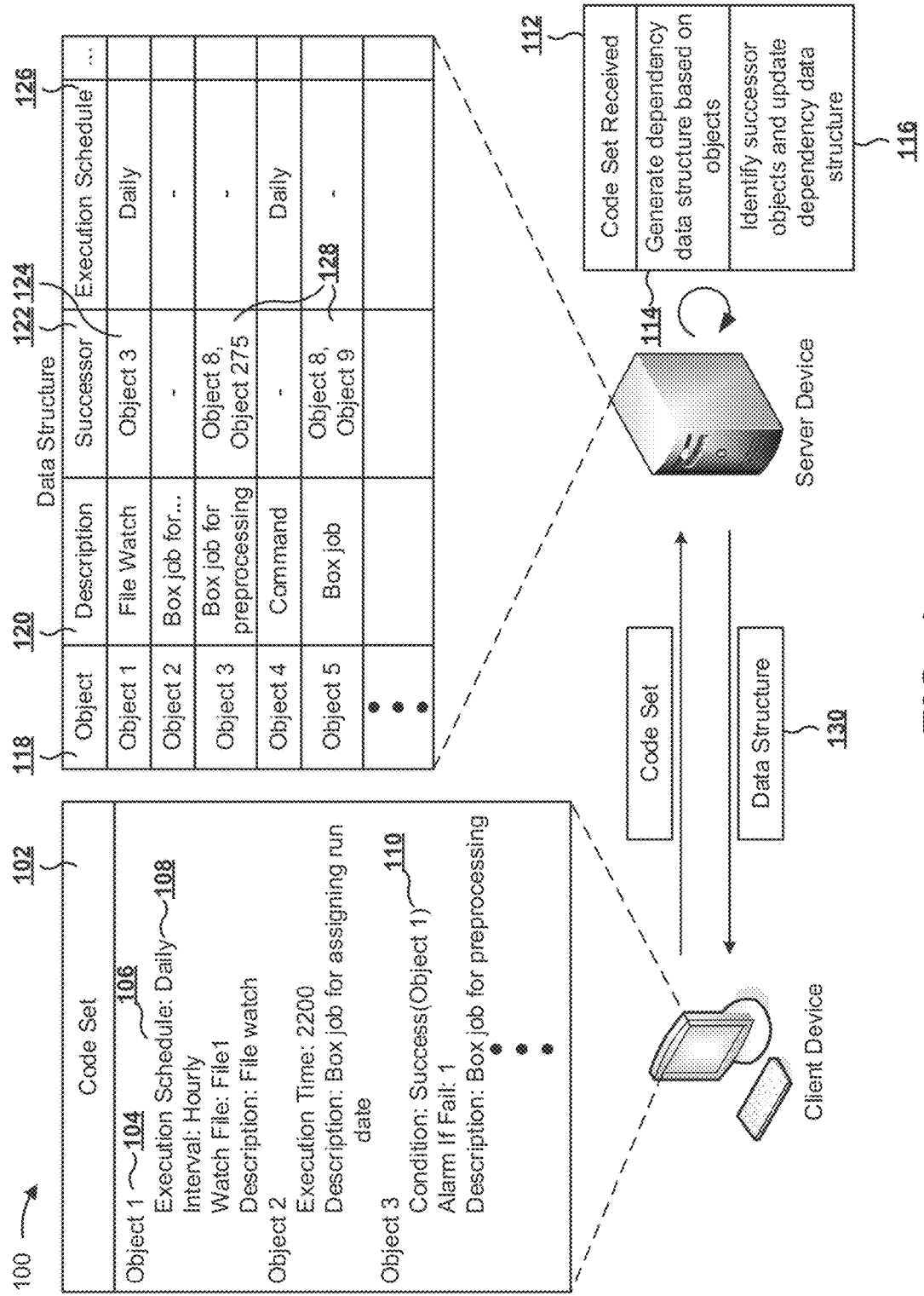
FIG. 1 is a diagram of an overview of an example implementation described herein.

The following detailed description of example implementations refers to the accompanying drawings. The same reference numbers in different drawings may identify the same or similar elements.

A user (e.g., a computer programmer, a data technician, etc.) may generate or organize a set of jobs to be performed. Within such a set of jobs, a job may include any task, process, executable, instruction, function, and/or the like. For example, jobs may be identified by a computer program, a code set, or a set of queued jobs (e.g., jobs to be performed).

In some cases, jobs may be dependent on other jobs. For example, one job may require input information that is provided as output information by another job. As another example, one job may require data to be preprocessed based on another job. When a first job is dependent on a second job, the first job may be referred to as a successor job, the second job may be referred to as a predecessor job, and the relationship between the first job and the second job may be referred to as a dependency.

As one example, jobs may be associated with an Autosys job control system, which includes three types of jobs. The first type of job is a command job, which is a job that executes a command with regard to one or more files. The second type of job is a box job, which is a container that holds a set of jobs. The third type of job is a file watcher, which is a job that monitors for generation or arrival of a particular file. As an example of a dependency in an Autosys job control system, when a command job is to perform an operation with regard to a particular file, the command job may require that a file watcher job detect the particular file.

In a system that utilizes jobs, it may be important to identify successor jobs in order to create, modify, or maintain the system, to diagnose errors, and/or the like. It is not uncommon, however, for such a system to be implemented with a code set (e.g., a program or routine) that has a very large number of jobs (e.g., 10,000 jobs, 100,000 jobs, etc.). Thus, a great deal of time and effort may be required to review the code set and identify successor jobs manually. Furthermore, a user may need to submit a different query for each job included in the code set to identify predecessors and successors of each job, which may consume processor resources of the system.

Implementations described herein may automatically identify predecessor and successor jobs from within a code set. For example, a server device may generate a dependency data set that identifies the predecessor and successor jobs, as well as attributes and/or metadata of the predecessor and/or successor jobs. Furthermore, the server device may identify actions to perform based on the dependency data set. For example, the server device may identify jobs that are missing a predecessor, and may suggest that predecessor jobs be added for the jobs that are missing a predecessor. As another example, the server device may identify unnecessary or redundant jobs (e.g., an Autosys file watcher job that has no successor job), and may suggest that the unnecessary or redundant jobs be removed.

In this way, the server device reduces a quantity of queries required to identify successor jobs, which conserves processor resources and temporal resources. Furthermore, the server device facilitates further analysis of a dependency data structure to identify actions to perform. Still further, the server device enables processing of arbitrarily large code sets to identify successor jobs. Additionally, the server device may provide a dependency data structure in a machine-readable format, thereby permitting further processing and/or analysis of the dependency data structure.

FIG. 1 is a diagram of an overview of an example implementation 100 described herein. As shown in FIG. 1, example implementation 100 may include a client device and a server device. As shown by reference number 102, the client device may store a code set. In some implementations, the code set may include a job management file. For example, the job management file may be a job information language (JIL) file, which is a file type of a batch of jobs used in an Autosys job control system, or a similar job management file. As shown by reference number 104, the code set may include a number of objects. For example, the objects may be jobs, such as Autosys jobs. As shown by reference number 106, an object may be associated with an attribute (e.g., "Execution Schedule," which may indicate a frequency or schedule at which the object is to be executed or processed). As shown by reference number 108, the attribute may be associated with a value of the attribute (e.g., "Daily"). As shown by reference number 110, an object may include or be associated with a condition (e.g., Object 3 may include "Condition: Success (Object 1)," in which case Object 3 will not be allowed to run until Object 1 has successfully completed).

In some cases, predecessor objects or successor objects may be identified based on a manual review of the code set. In this case, determining all predecessor objects of a particular object may be a simple matter, as the dependencies are indicated by content (e.g., attributes, functions, etc.) that is located within the particular object (e.g., in a single section of code associated with the particular object). For example, it can be determined that Object 1 is a predecessor object of Object 3 by locating the section of code associated with Object 3, which includes the condition dependent on Object 1).

However, identifying all successor objects of a particular object is not a simple matter to perform manually, as the dependencies are indicated by content that is not located within the particular object. Rather, the dependencies are indicated by content that is located within each of the successor objects. Thus, manually identifying all successor objects of a particular object requires manual review of a potentially large number (e.g., 10,000, 100,000, etc.) of different successor objects. This may take hours or days, and may be prone to error.

As shown by reference number 112, the server device may receive the code set. As shown by reference number 114, the server device may generate a dependency data structure based on objects within the code set. For example, the server device may create a data structure (e.g., a spreadsheet, a table, etc.) with an entry for each object (e.g., job) in the code set. As shown by reference number 116, the server device may identify successor objects and update the dependency data structure. For example, the server device may scan the code set to identify successor jobs (e.g., jobs that receive input from predecessor jobs), and may update the spreadsheet entries of the predecessor jobs to identify the successor jobs. The server device may also add attribute data and/or metadata for the jobs to the spreadsheet.

As shown by reference number 118, the data structure may identify (e.g., in a column of a spreadsheet) the objects identified by scanning the code set. As shown by reference number 120, the data structure may include a description of each object, such as a job type of an Autosys job. As shown by reference number 122, the data structure may identify all successor objects of each object. For example, as shown by reference number 124, the data structure may identify "Object 3" as a successor of "Object 1." As shown by reference number 126, the data structure may include columns for attributes associated with each object, such as a column for an "Execution Schedule" attribute, and/or the like.

As shown by reference number 128, an object may be associated with multiple successor objects. For example, Object 8 and Object 275 are successor objects of Object 3. As described above, determining all successor objects of a particular object by manual review may not be a simple matter. By automatically scanning the code set and associating all successor objects with the particular object in a data structure (as shown by reference number 122) the server device allows for all successor objects of the particular object to be easily identified. For example, it can be quickly determined that Objects 8 and 275 are the successor objects of Object 3. As shown by reference number 130, the server device may provide the dependency data structure to the client device. In some implementations, the server device may perform an action based on the dependency data structure (e.g., inserting comments in the code set, rearranging objects of the code set, removing objects from the code set, etc.).

In this way, the server device reduces time and errors in identifying successor jobs of a code set. Furthermore, the server device permits analysis of a dependency data structure to identify actions to perform. Still further, the server device enables processing of arbitrarily large code sets to identify successor jobs. Additionally, the server device may provide a dependency data structure in a machine-readable format, thereby permitting further processing and/or analysis of the dependency data structure.

Figure 2:
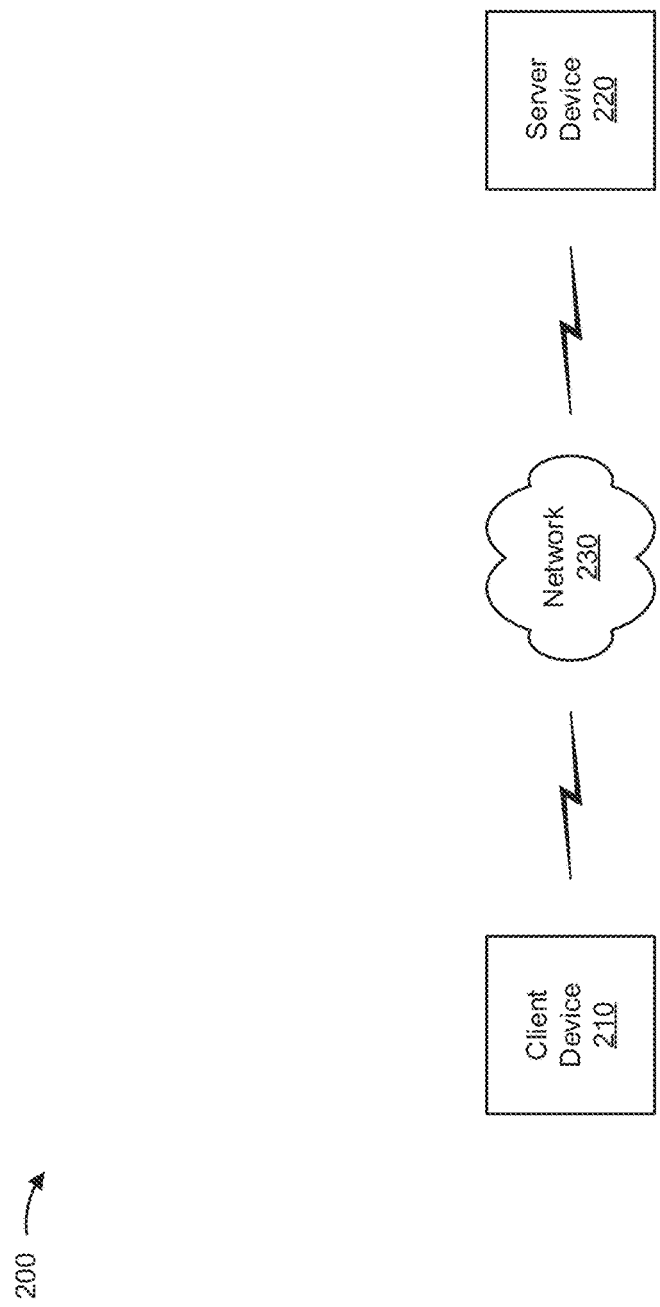
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 includes one or more devices capable of receiving, generating, storing, processing, and/or providing information associated with a code set. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Server device 220 may include one or more devices capable of receiving, generating, storing, processing, and/or providing information associated with generating a dependency data structure based on a code set. For example, server device 220 may include a server, a group of servers, one or more devices implemented in a cloud-based environment, and/or the like.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
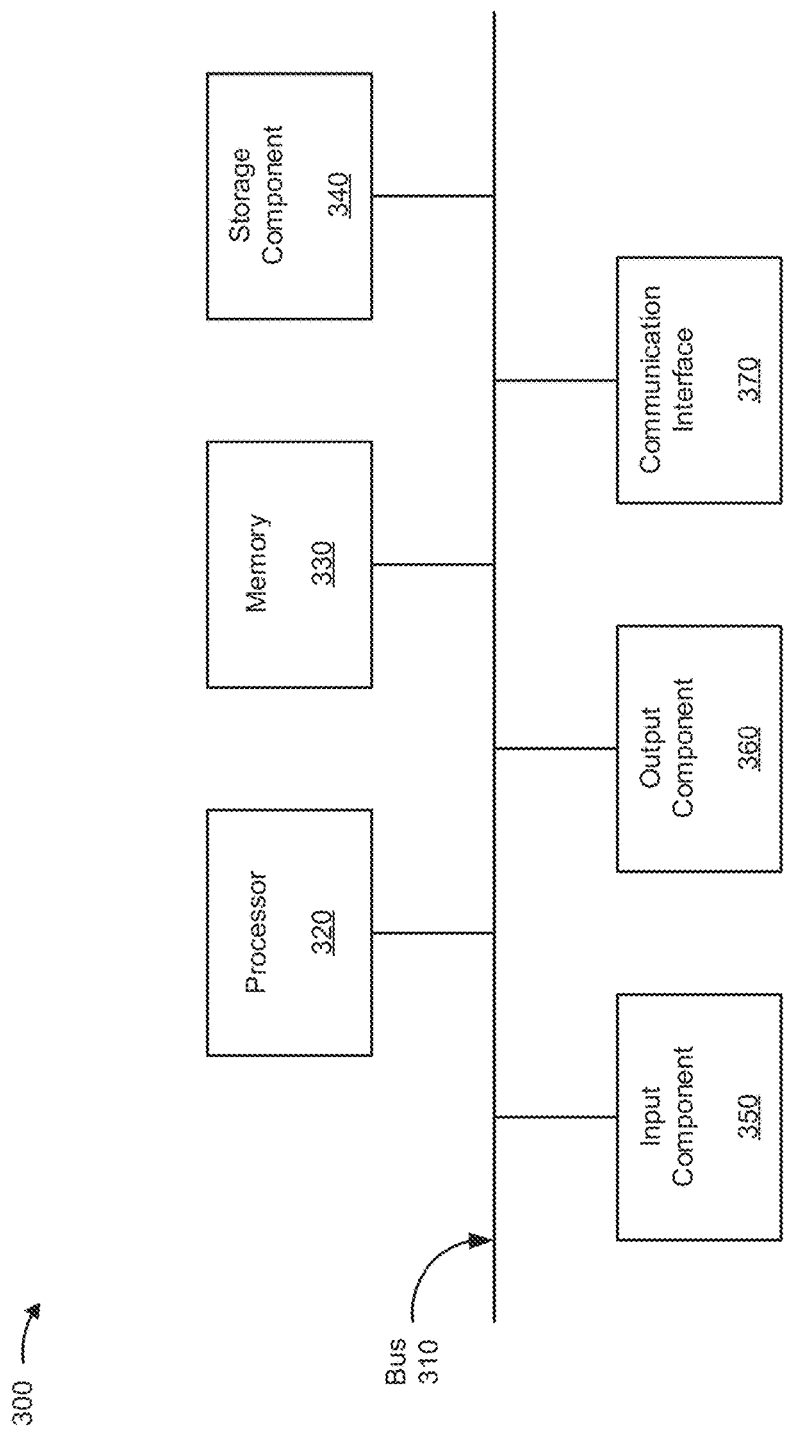
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include one or more processors (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
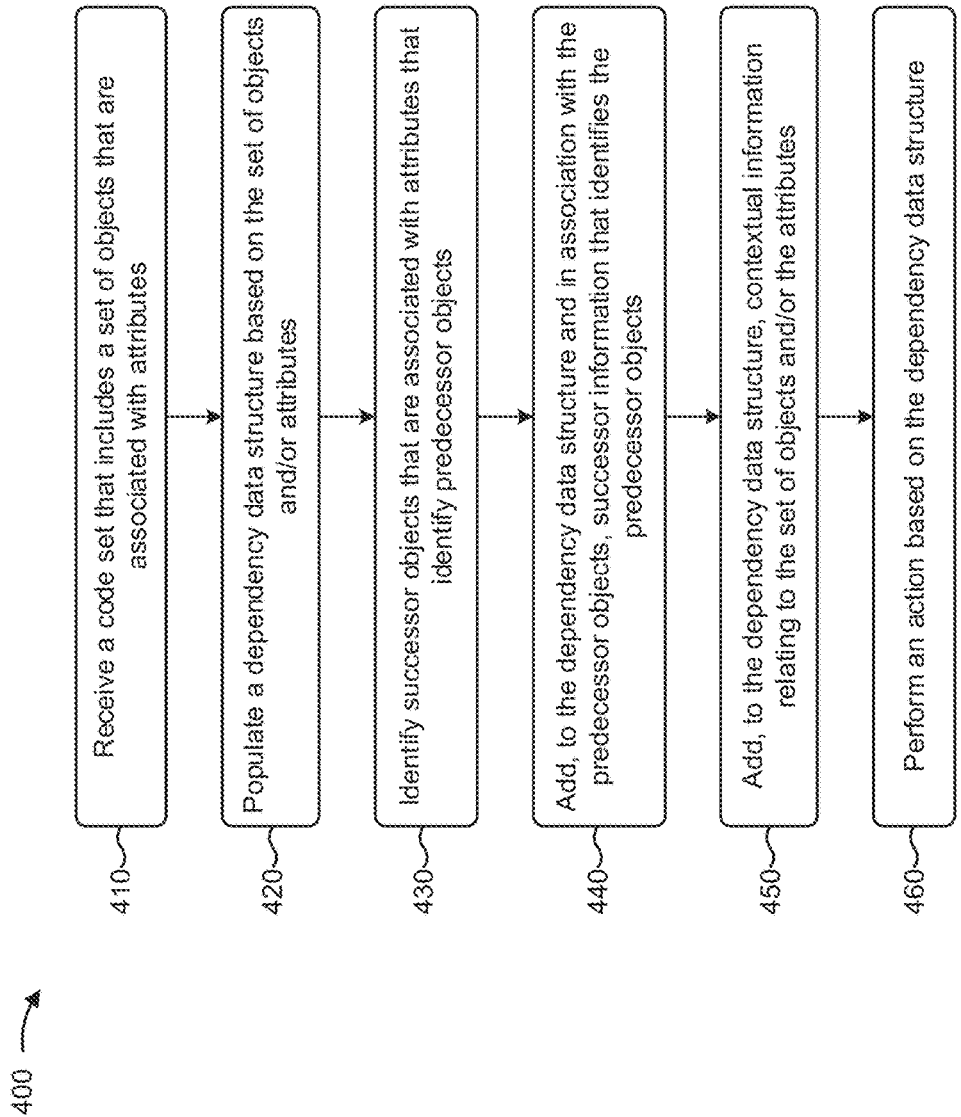
FIG. 4 is a flow chart of an example process for generating a dependency data structure based on a set of objects of a code set.

FIG. 4 is a flow chart of an example process 400 for generating a dependency data structure based on a set of objects of a code set. In some implementations, one or more process blocks of FIG. 4 may be performed by server device 220. In some implementations, one or more process blocks of FIG. 4 may be performed by another device or a group of devices separate from or including server device 220, such as client device 210.

As shown in FIG. 4, process 400 may include receiving a code set that includes a set of objects that are associated with attributes (block 410). For example, server device 220 may receive a code set that includes a set of objects. In some implementations, an object from the set of objects may include a job, an executable, an instruction, a line of code, and/or the like. For example, an object may include a job for a job control system (e.g., an Autosys job control application, an IBM Job Control Language (JCL) system, etc.).

In some implementations, server device 220 may receive a code set from client device 210 (e.g., based on user input to generate the code, based on client device 210 storing the code set, etc.). In some implementations, server device 220 may receive the code set from multiple different devices. For example, parts of the code set may be distributed to multiple, different client devices 210, and server device 220 may receive or obtain the code set from the multiple, different client devices 210. In this way, server device 220 allows analysis of dependencies in a set of jobs that are distributed across multiple devices, which may permit identification of dependencies between parts of the code set that are stored by or executed on different devices. This, in turn, may permit optimization of execution of the code set (e.g., by grouping successor objects and predecessor objects on particular devices).

In some implementations, server device 220 may receive an update to a code set. Additionally, or alternatively, server device 220 may receive (e.g., from a same device, or from a different devices) portions of a code set at different times. For example, when client device 210 receives additional objects that are to be added to a code set, client device 210 may provide the additional objects to server device 220 for analysis. In this way, server device 220 allows analysis of updated code sets to identify dependencies of objects or jobs added to a code set.

In some implementations, objects may be associated with attributes that specify rules for performing actions associated with objects. For example, an attribute may indicate a frequency or schedule based on which to perform an action, a time frame in which to perform an action, a file on which to perform an action, a condition that must be satisfied before an action can be performed, and/or the like. In some cases, an attribute may be associated with a value. For example, an attribute that defines a schedule for performing an action may be associated with a value of "weekly," "daily," "every 6 hours," or a similar value.

As one possible example, an Autosys job may include essential job attributes such as a job name attribute to identify the job, a job type attribute (e.g., command, file watcher, or box), and/or the like. An Autosys job may further include optional job attributes, such as a command attribute (e.g., the name of an executable, a script, etc.), a machine attribute (e.g., a client machine on which the command should be run), a condition attribute (e.g., indicating a condition that must be satisfied in order for the job to be performed), a date condition attribute (e.g., indicating an existence of a time condition for starting the job), a "days of week" attribute (e.g., specifying days of the week on which the job should be run), and/or the like. Other examples of attributes are possible, and implementations described herein are not limited to objects corresponding to Autosys jobs.

As further shown in FIG. 4, process 400 may include populating a dependency data structure based on the set of objects and/or attributes (block 420). For example, server device 220 may generate or populate a dependency data structure. In some implementations, the dependency data structure may include an entry for each object of the code set. For example, server device 220 may assign an identifier to each object of the code set, and may populate entries in the dependency data structure corresponding to each object. In some implementations, the dependency data structure may identify information regarding objects and/or attributes associated with the objects. In this case, the dependency data structure may identify object identifiers, object names, attributes of objects, and/or the like. For example, in an Autosys job environment, the dependency data structure may identify a job name attribute, a job type attribute, a command attribute, a machine attribute, a condition attribute, a date condition attribute, a "days of week" attribute, and/or the like.

In some implementations, the dependency data structure may include a directed graph, which may permit server device 220 to identify relationships between objects based on links between nodes of the directed graph. In some implementations, the dependency data structure may include a tabular data structure such as a table, a spreadsheet, and/or the like, which may conserve processing and/or storage resources as compared to a directed graph. In some implementations, the dependency data structure may include a different type of data structure. Implementations described herein are not limited to those that use a directed graph or a tabular data structure.

As further shown in FIG. 4, process 400 may include identifying successor objects that are associated with attributes that identify predecessor objects (block 430). For example, server device 220 may identify successor objects and corresponding predecessor objects. In some implementations, server device 220 may identify a particular successor object and a particular predecessor object based on the particular successor object and the particular predecessor object being linked by a relationship. For example, a successor object may identify a predecessor object to monitor, and may identify an action to perform after the predecessor object is processed and/or based on a condition associated with the predecessor object. As another example, a successor object may receive, as input information, output information generated by a predecessor object.

In some implementations, server device 220 may identify the successor objects and the predecessor objects based on attributes of the set of objects. For example, when an executable associated with a first object receives or obtains an input from a second object, server device 220 may identify the second object as a predecessor object of the first object. As another example, when a box job identifies one or more jobs to perform when a file watcher job identifies a particular file, server device 220 may identify the box job and/or the one or more jobs as successor jobs of the file watcher job. Server device 220 may identify the relationships between the objects based on information included in the objects. For example, a successor object may include a line of code that identifies a predecessor object and information associated with the predecessor object (e.g., a condition associated with the predecessor object, information to be received from the predecessor object, a command to perform based on the predecessor object, etc.), and server device 220 may identify the relationship between the successor object and the predecessor object based on the line of code.

In some implementations, server device 220 may identify predecessor and successor objects without submitting queries corresponding to each predecessor and successor object. For example, to manually identify predecessor and successor objects, a user may need to submit multiple, different queries to obtain information for each object. This may be time-consuming and may waste computational resources. Server device 220 may receive the code set, and may parse the code set to generate the dependency data structure without generating queries for each object. Thus, server device 220 conserves processor and temporal resources that would otherwise be used to manually evaluate each object based on queries for each object.

As further shown in FIG. 4, process 400 may include adding, to the dependency data structure and in association with the predecessor objects, dependency information that identifies the successor objects (block 440). For example, server device 220 may add dependency information to the dependency data structure based on identifying the successor objects. In some implementations, dependency information may identify successor objects that correspond to each predecessor object. For example, server device 220 may add, to an entry in the dependency data structure corresponding to a predecessor object, information identifying each successor object corresponding to the predecessor object. As another example, an example of dependency information is shown by reference numbers 124 and 128 in FIG. 1.

In some implementations, server device 220 may add the dependency information as server device 220 populates the dependency data structure. For example, when a particular object is associated with three successor objects, server device 220 may populate the dependency data structure with an entry corresponding to the particular object, and as server device 220 processes each of the three successor objects to populate or generate the dependency data structure, server device 220 may add, to the entry corresponding to the particular object, information that identifies the successor objects. In this way, server device 220 automatically identifies successor objects corresponding to a predecessor object, which saves time as compared to manually identifying the successor objects. Furthermore, this may permit server device 220 to update the dependency data structure as server device 220 receives additional objects to be added to the dependency data structure, which conserves computational resources that would otherwise be used to repopulate the entire dependency data structure.

As further shown in FIG. 4, process 400 may include adding, to the dependency data structure, contextual information relating to the set of objects and/or the attributes (block 450). For example, server device 220 may add contextual information to the dependency data structure. In some implementations, contextual information may identify attributes of the set of objects (e.g., values of attributes, attributes that are defined or undefined for a particular object, etc.). For example, in an Autosys job environment, the contextual information may identify a job name attribute, a job type or object type attribute, a command attribute, a machine attribute, a condition attribute, a schedule attribute, a date condition attribute, a "days of week" attribute, and/or the like.

In some implementations, contextual information may include metadata regarding the objects. For example, contextual information may identify or include a particular code set in which the objects were included. As another example, contextual information may identify a device from which the objects were received or obtained. As still another example, contextual information may indicate a type of relationship between a successor object and a predecessor object. In this case, when a successor object is a command job that executes when a predecessor object satisfies a conditional (e.g., when the predecessor object finds a particular file, satisfies a value, is completed, etc.), the contextual information may indicate that the relationship is based on the conditional.

As further shown in FIG. 4, process 400 may include performing an action based on the dependency data structure (block 460). For example, server device 220 may perform one or more actions based on the dependency data structure. In some implementations, server device 220 may provide the dependency data structure. For example, server device 220 may provide the dependency data structure for display by client device 210, as an exported file, and/or the like. In some implementations, server device 220 may provide a portion of the dependency data structure, such as each entry corresponding to a predecessor object. In this way, server device 220 may conserve computational resources that would otherwise be used to provide the entirety of the dependency data structure. In some implementations, server device 220 may provide the dependency data structure in a machine-readable format. In this way, server device 220 may permit further analysis of the dependency data structure.

In some implementations, server device 220 may identify an object that is associated with an error. For example, server device 220 may identify an object that is expected to be associated with a successor object and is not associated with a successor object (e.g., a file watcher job that is not associated with a subsequent box job or command job). As another example, server device 220 may identify an object that is associated with an error when an object should have a predecessor object but does not have a predecessor object (e.g., when an object must receive an input to be performed, but is not associated with a predecessor job to provide the input). As still another example, server device 220 may identify an object that is associated with an error when a successor object should not call a particular object as a predecessor object (e.g., when the successor object requires a particular format of input that the predecessor object does not output, etc.). By identifying objects associated with errors, server device 220 facilitates debugging of the code set and reduces runtime errors, improper input/output handling, and the like.

In some implementations, server device 220 may store the dependency data structure. For example, server device 220 may store a portion of the dependency data structure, such as a portion that includes each entry corresponding to a predecessor object, each entry associated with an error, and/or the like. In this way, server device 220 conserves storage space that would otherwise be used for the whole dependency data structure.

In some implementations, server device 220 may generate a visual or graphical representation of the dependency data structure (e.g., a tree). In this way, server device 220 may aid in user interpretation of the dependency data structure, thus conserving computational resources that would be used to provide the dependency data structure in a less user-friendly format.

In some implementations, server device 220 may modify the code set based on the relationships. For example, server device 220 may modify the code set by adding comments, corresponding to predecessor objects, that identify the successor objects. As another example, server device 220 may modify the code set based on flagging, for removal from the code set, objects that have no successor object for removal. In this way, server device 220 may aid in user interpretation of the code set.

In some implementations, server device 220 may cause predecessor objects to be executed or processed before successor objects. Additionally, or alternatively, server device 220 may rearrange the code set based on predecessor objects. For example, server device 220 may rearrange the code set by grouping predecessor objects with each other, grouping a predecessor object with the corresponding successor objects, and/or the like. As another example, when a set of jobs is distributed across two or more devices, server device 220 may cause predecessor jobs and corresponding successor jobs to be group on the same device of the two or more devices. In this way, server device 220 improves efficiency of executing the code set, thus conserving computational resources.

In some implementations, server device 220 may provide help information for a particular object, relationship, or attribute. For example, server device 220 may receive a request for help information pertaining to a particular object, relationship, or attribute, and may provide a textual description of the particular object, relationship, or attribute. In some implementations, server device 220 may provide a sample of an object. For example, server device 220 may provide a sample of a box job, a command job, a file watcher job, and/or the like. Thus, server device 220 may reduce errors related to improper formatting or generation of objects, which conserves computational resources of server device 220 or another device that executes the code set.

Implementations described herein may automatically identify predecessor and successor jobs of a code set. For example, implementations described herein may provide a server device that generates a dependency data set that identifies the predecessor and successor jobs, as well as attributes and/or metadata of the predecessor and/or successor jobs. Furthermore, the server device may identify actions to perform based on the dependency data set. For example, the server device may identify jobs that are missing a predecessor. As another example, the server device may identify unnecessary jobs (e.g., an Autosys file watcher job that has no successor job).

In this way, the server device reduces manual effort and time expenditure to identify successor jobs. Furthermore, the server device permits analysis of a dependency data structure to identify actions to perform. Still further, the server device enables processing of arbitrarily large code sets to identify successor jobs. Additionally, the server device may provide a dependency data structure in a machine-readable format, thereby permitting further processing and/or analysis of the dependency data structure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example dependency data structure 500 relating to example process 400 shown in FIG. 4. As shown in FIG. 5, in some cases, dependency data structure 500 may be implemented in a tabular format, such as a spreadsheet, and/or the like. In some implementations, dependency data structure 500 may be generated based on a code set. For example, assume that the code set is received by server device 220, and assume that server device 220 generates the dependency data structure based on the code set. In this case, dependency data structure 500 may include object identifiers (shown by reference number 505) corresponding to jobs of a code set. Here, dependency data structure 500 uses job numbers corresponding to the jobs of the code set.

Dependency data structure 500 may identify predecessor objects (shown by reference number 510 as the "Dependency" column), and may identify a corresponding condition or particular relationship (shown by reference number 515) where appropriate. For example, here, dependency data structure 500 indicates that a DET_PROCESS_BOX job is to be executed when a DET_Q_5957 job is successfully executed. Dependency data structure 500 may also identify successor objects (shown by reference number 520). For example, here, dependency data structure 500 indicates that the DET_PROCESS_BOX job is a successor object of the DET_Q_5957 job (e.g., based on the DET_PROCESS_BOX job being associated with a conditional based on a result of the DET_Q_5957 job). In this way, by automatically identifying all successor objects of a particular object, dependency data structure 500 allows for all successor objects of the particular object to be quickly and easily identified.

As further shown, dependency data structure 500 may identify contextual information and/or attributes of box jobs (shown by reference number 525), such as a box name (e.g., that identifies a container associated with a box job). As shown by reference number 530, dependency data structure 500 may identify contextual information and/or attributes of command jobs, such as particular commands that are to be performed when the command jobs are execute (e.g., sendevent–E SET_GLOBAL–G "DATADATE='DATE'+% y % m % d'"). As shown by reference number 535, dependency data structure 500 may identify descriptions corresponding to each object (e.g., based on description attributes corresponding to each object). As shown by reference number 540, the descriptions may identify job types, purposes associated with the jobs, and/or the like.

As shown by reference number 545, dependency data structure 500 may identify other contextual information and/or attributes of objects (shown by reference number 545). Such other contextual information and/or attributes may include an "Alarm if Fail" attribute that indicates whether an alarm should be generated if the job fails to run, a "Date Condition" attribute that indicates existence of a time condition for starting the job, a "Start Time" attribute that identifies a start time for starting the job, a "Days of Week" attribute that identifies days of the week on which the job should be executed, a "Watch File" attribute for identifying a file to be watched in association with a file watcher job, a "Watch Interval" attribute for specifying an interval of time between file checker iterations, and/or the like.

As indicated above, FIG. 5 is provided merely as an example. Other examples are possible and may differ from what was described with regard to FIG. 5.

In this way, the server device reduces manual effort and time expenditure to identify successor jobs. Furthermore, the server device permits analysis of a dependency data structure to identify actions to perform. Still further, the server device enables processing of arbitrarily large code sets to identify successor jobs. Additionally, the server device may provide a dependency data structure in a machine-readable format, thereby permitting further processing and/or analysis of the dependency data structure.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a code set that includes a plurality of objects,
   the plurality of objects including one or more successor objects and one or more predecessor objects corresponding to the one or more successor objects,
   the one or more predecessor objects, when processed, generating output information that is used as input information by the one or more successor objects;
   populate a data structure based on the code set,
   the data structure identifying each object of the plurality of objects;
   identify relationships between the one or more successor objects and the one or more predecessor objects;
   add, to the data structure and in association with the one or more predecessor objects, dependency information that identifies the relationships between the one or more successor objects and the one or more predecessor objects,
   the dependency information identifying the one or more successor objects;
   where the one or more processors, when adding the dependency information, are to:
   add, to entries of the data structure corresponding to each successor object of the one or more successor objects, information identifying each predecessor object, of the one or more predecessor objects, that is associated with each successor object; and
   identify an object, of the plurality of objects, that is associated with an error based on the dependency information added to the data structure,
   the error being identified based on the object not being associated with an expected successor object or expected predecessor object, and
   the expected successor object or the expected predecessor object being determined based on the entries of the data structure.

2. The device of claim 1, where the one or more processors, when identifying the relationships between the one or more successor objects and the one or more predecessor objects, are to:
   identify a particular relationship, of the relationships, based on an attribute of a particular successor object, of the one or more successor objects, that identifies a particular predecessor object of the one or more predecessor objects; and
   where the one or more processors, when adding the dependency information that identifies the relationships, are to:
   add, to an entry of the data structure that corresponds to the particular predecessor object, information that identifies the particular successor object.

3. The device of claim 2, where the one or more processors, when adding the dependency information to the data structure, are to:
   add information that identifies the attribute of the particular successor object to the data structure.

4. The device of claim 1, where the dependency information for a particular predecessor object, of the one or more predecessor objects, identifies every successor object, of the one or more successor objects, that is associated with the particular predecessor object.

5. The device of claim 1, where the plurality of objects include jobs associated with a job control system.

6. The device of claim 1, where the one or more processors, when receiving the code set, are to:
   receive the code set from a plurality of other devices; and
   where the one or more processors, when populating the data structure, are to:
   add, to the data structure for a particular object, of the plurality of objects, information that identifies a particular other device, of the plurality of other devices, from which the particular object was received.

7. The device of claim 1, where the one or more processors, when populating the data structure, are to:
identify a plurality of attributes associated with the plurality of objects; and
add, to the data structure, information identifying the plurality of attributes or values of the plurality of attributes.

8. The device of claim 7, where the plurality of attributes include one or more of:
a name attribute that identifies a name of an object of the plurality of objects,
an object type attribute that identifies a type of an object of the plurality of objects,
a command attribute that identifies a command to be executed based on an object of the plurality of objects,
an attribute that identifies a particular device on which an object, of the plurality of objects, is to be stored or executed,
a condition attribute that identifies a condition for execution of an object of the plurality of objects, or
a schedule attribute that identifies one or more times at which an object, of the plurality of objects, is to be executed.

9. A computer-readable medium storing instructions, the instructions comprising:
one or more instructions that, when executed by one or more processors, cause the one or more processors to:
receive a code set that includes a plurality of objects,
the plurality of objects including one or more successor objects and one or more predecessor objects corresponding to the one or more successor objects,
the one or more predecessor objects, when processed, generating output information that is used as input information by the one or more successor objects;
populate a data structure based on the code set,
the data structure identifying each object of the plurality of objects;
identify relationships between the one or more successor objects and the one or more predecessor objects;
add, to the data structure and in association with entries corresponding to the one or more predecessor objects, dependency information that identifies the one or more successor objects,
where the one or more instructions, which cause the one or more processors to add the dependency information, cause the one or more processors to:
add, to entries of the data structure corresponding to each successor object of the one or more successor objects, information identifying each predecessor object, of the one or more predecessor objects, that is associated with each successor object; and
identify an object, of the plurality of objects, that is associated with an error based on the dependency information added to the data structure,
the error being identified based on the object not being associated with an expected successor object or expected predecessor object, and
the expected successor object or the expected predecessor object being determined based on the entries of the data structure.

10. The computer-readable medium of claim 9, where the one or more instructions, that cause the one or more processors further cause the one or more processors to:
add comments to the code set,
the comments identifying the one or more predecessor objects or the one or more successor objects.

11. The computer-readable medium of claim 9, where the one or more instructions, that cause the one or more processors to add the dependency information that identifies the one or more successor objects, cause the one or more processors to:
add, to the data structure and in association with a particular object of the one or more predecessor objects, information that identifies every successor object associated with the particular object.

12. The computer-readable medium of claim 9, where the one or more instructions, that cause the one or more processors to identify the relationships between the one or more successor objects and the one or more predecessor objects, cause the one or more processors to:
identify a particular relationship, of the relationships, based on an attribute of a particular successor object, of the one or more successor objects, that identifies a particular predecessor object of the one or more predecessor objects; and
where the one or more instructions, that cause the one or more processors to add the dependency information that identifies the relationships, cause the one or more processors to:
add, to an entry of the data structure that corresponds to the particular predecessor object, information that identifies the particular successor object.

13. The computer-readable medium of claim 12, where the one or more instructions, that cause the one or more processors to add the dependency information to the data structure, cause the one or more processors to:
add information that identifies the attribute of the particular successor object to the data structure.

14. The computer-readable medium of claim 9, where the one or more instructions, that cause the one or more processors to populate the data structure, cause the one or more processors to:
assign a plurality of respective identifiers to the plurality of objects;
generate the data structure,
the data structure having a plurality of entries that identify the plurality of respective identifiers; and
add, to the plurality of entries, information that identifies attributes of the plurality of objects.

15. The computer-readable medium of claim 14, where the code set is received from a plurality of devices; and
where the one or more instructions, that cause the one or more processors to populate the data structure, cause the one or more processors to:
add, to an entry of the data structure that corresponds to a particular object, of the plurality of objects, information that identifies a particular device, of the plurality of devices, from which the particular object was received.

16. A method, comprising:
receiving, by a device, a code set that identifies a plurality of jobs,
the plurality of jobs including a plurality of successor jobs and a plurality of predecessor jobs corresponding to the plurality of successor jobs, each predecessor job, of the plurality of predecessor jobs, to be performed or executed before one or more corresponding successor jobs of the plurality of successor jobs;

populating, by the device, a data structure based on the code set, the data structure identifying the plurality of predecessor jobs and the plurality of successor jobs;

identifying, by the device, relationships between the plurality of predecessor jobs and the plurality of successor jobs, the relationships identifying each predecessor job and the one or more corresponding successor jobs associated with each predecessor job;

adding, by the device to the data structure, dependency information that identifies the relationships between the plurality of predecessor jobs and the plurality of successor jobs, the dependency information identifying the plurality of successor jobs, and the dependency information being added to entries of the data structure corresponding to the plurality of predecessor jobs, where adding the dependency information includes:
adding, to entries of the data structure corresponding to each successor job of the plurality of successor jobs, information identifying each predecessor job, of the plurality of predecessor jobs, that is associated with each successor job; and identifying, by the device, a job, of the plurality of jobs, that is associated with an error based on the dependency information added to the data structure, the error being identified based on the job not being associated with an expected successor job or expected predecessor job, and the expected successor job or the expected predecessor job being determined based on the entries of the data structure.

17. The method of claim 16, where the code set includes a job information file for a job control system.

18. The method of claim 16, further comprising:
identifying, based on the code set, attributes of the plurality of jobs; and
adding, to entries of the data structure corresponding to the plurality of jobs, information that identifies values of the attributes.

19. The method of claim 16, where identifying the relationships between the plurality of predecessor jobs and the plurality of successor jobs comprises:
determining that a first job, of the plurality of jobs, is a predecessor job of a second job, of the plurality of jobs, based on an attribute associated with the second job, the attribute identifying the first job.

20. The method of claim 16, further comprising:
providing the data structure in a machine-readable format; and
providing the data structure for display.

* * * * *